(12) United States Patent
Tsubouchi et al.

(10) Patent No.: US 6,446,537 B1
(45) Date of Patent: Sep. 10, 2002

(54) VACUUM BRAKE BOOSTER

(75) Inventors: Kaoru Tsubouchi, Toyota; Akihiko Miwa, Anjo, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/677,178

(22) Filed: Oct. 2, 2000

(30) Foreign Application Priority Data

Sep. 30, 1999 (JP) ............................................ 11-279755

(51) Int. Cl.[7] ................................................. B60T 8/44
(52) U.S. Cl. ..................................... 91/376 R; 303/155
(58) Field of Search ............................ 91/369.2, 369.3, 91/376 R; 303/155, 191

(56) References Cited

U.S. PATENT DOCUMENTS

| | | | | |
|---|---|---|---|---|
| 4,800,799 A | * | 1/1989 | Nishii | 91/369.2 |
| 5,275,265 A | | 1/1994 | Castel | 91/376 R |
| 5,881,628 A | * | 3/1999 | Bacardit | 91/369.1 |
| 5,890,775 A | | 4/1999 | Tsubouchi et al. | 91/376 R |

FOREIGN PATENT DOCUMENTS

| | | | |
|---|---|---|---|
| DE | 19635016 A1 | * | 3/1997 |
| FR | WO-98/05541 | * | 2/1998 |
| JP | 59-92244 A | | 5/1984 |
| JP | 60-25839 A | | 2/1985 |
| JP | 4-2455 | | 1/1992 |
| JP | 5-201316 | | 8/1993 |

* cited by examiner

*Primary Examiner*—F. Daniel Lopez
*Assistant Examiner*—Thomas E. Lazo
(74) *Attorney, Agent, or Firm*—Burns, Doane, Swecker & Mathis, LLP

(57) ABSTRACT

A vacuum brake booster includes a housing provided with at least one pressure chamber, a movable wall dividing the pressure chamber into a front chamber connected to the vacuum source and a rear chamber selectively connected to the front chamber and atmospheric pressure, a power piston connected to the movable wall, an input member disposed in the power piston, and a valve mechanism. An output member outputs the forward movement force of the power piston by moving forwardly with forward movement of the power piston in response to the movement of the movable wall. An auxiliary movable wall is disposed in the front chamber and is movable in the forward and rearward directions. The auxiliary movable wall moves the output member through engagement with the output member. A partition member is disposed in the front chamber and defines an auxiliary chamber in the front chamber with the auxiliary movable wall. The rear chamber and the auxiliary chamber are adapted to be connected with each other.

9 Claims, 9 Drawing Sheets

VACUUM BRAKE BOOSTER

This application is based on and claims priority under 35 U.S.C. §119 with respect to Japanese Application No. 11(1999)-279755 filed on Sep. 30, 1999, the entire content of which is incorporated herein by reference.

FIELD OF THE INVENTION

This invention generally relates to brake device used in a vehicle. More particularly, the present invention pertains to a vacuum brake booster to assist brake operation for a vehicle.

BACKGROUND OF THE INVENTION

A known brake booster for an automobile is disclosed in a U.S. Pat. No. 5,890,775 issued on Apr. 6, 1999. This brake booster includes a housing in which is defined a at least one pressure space, a movable wall disposed in the housing for movement in the forward and rearward directions with respect to the housing and for dividing the pressure space into a front chamber to be connected to a vacuum source of the automobile and a rear chamber selectively connected the front chamber and atmospheric pressure, and a power piston connected to the movable wall. An input member is disposed in the power piston and is movable in the forward and rearward direction with respect to the power piston by the operation of a brake operation device (e.g., a brake pedal). A valve mechanism includes a vacuum pressure valve connecting the rear chamber with the front chamber in response to the operation of the input member and an atmospheric pressure valve connecting the rear chamber with atmospheric pressure in response to the operation of the input member. An output member is movable in the forward direction in response to the movement of the power piston with the movable wall for outputting the forward movement force of the power piston to a driven device located outside the booster. An auxiliary movable wall is disposed in the front chamber and is movable in the forward and rearward directions, with the auxiliary movable wall moving the output member by engagement with the output member. A partition member is disposed in the front chamber and defines an auxiliary chamber between the front chamber and the auxiliary movable wall, and a valve controls communication of the auxiliary chamber with atmospheric pressure in an automobile compartment through the rear chamber or through a connecting pipe.

With this vacuum brake booster, the auxiliary chamber is connected to atmospheric pressure in the vehicle compartment through a connecting pipe by the valve. This structure requires a relatively complicated vehicle assembling step, which may reduce the operational or assembling efficiency associated with the brake booster. Further, this brake booster is a so-called high jump output type of brake booster which increases the output of the vacuum brake booster by operation of the auxiliary movable wall.

A need thus exists for a vacuum brake booster constructed in a way that improves the work efficiency associated with assembling the booster into the vehicle.

A need also exists for a vacuum brake booster capable of generating an output in response to the intent of the driver of the vehicle by increasing the output from the auxiliary movable wall of the booster in response to the input force.

SUMMARY OF THE INVENTION

According to the present invention, a vacuum brake booster includes a housing in which is provided at least one pressure chamber, a movable wall disposed in the housing and dividing the pressure chamber into a front chamber to be connected to a vacuum pressure source and a rear chamber selectively connected to the front chamber and atmospheric pressure, a power piston connected to the movable wall, an input member disposed in the power piston for movement in the front and rearward directions through operation of an operation member, and a valve mechanism having a vacuum valve connecting the rear chamber with the front chamber in response to the movement of the input member and an atmospheric pressure valve connecting the rear chamber to the atmospheric pressure in response to the movement of the input member. An output member outputs the forward force of the power piston by moving forward with the forward movement of the power piston in response to the movement of the movable wall, and an auxiliary movable wall is disposed in the front chamber and movable in forward and rearward directions. The auxiliary movable wall moves the output member through engagement with the output member. A partition member is disposed in the front chamber to define, with the auxiliary movable wall, an auxiliary chamber in the front chamber, with the rear chamber and the auxiliary chamber being connectable with each other.

The vacuum brake booster also includes a communication passage connecting the rear chamber and the auxiliary chamber, and a first valve disposed between the rear and auxiliary chambers for permitting or preventing fluid communication via the communication passage. The first valve selectively connects the auxiliary chamber with the vacuum pressure source or with the rear chamber. The first valve can be actuated in response to the vehicle condition to establish the communication between the auxiliary chamber and the rear chamber. The first valve can also be actuated by the operation of the driver of the vehicle to establish communication between the rear chamber and the auxiliary chamber.

The booster can also include a second valve located in the communication passage between the first valve and the rear chamber for establishing communication between the first valve and the rear chamber when the pressure in the rear chamber reaches a predetermined value. Communication between the first valve and the rear chamber can be established by the second valve when the pressure in the rear chamber reaches a predetermined value.

Vacuum Brake Booster for a Vehicle Comprising:

The present invention also provides a vacuum brake booster that includes a housing, a movable wall disposed in the housing for movement in forward and rearward directions and dividing the interior of the housing into a front chamber connectable to a vacuum pressure source and a rear chamber adapted to be selectively communicated with the front chamber and atmospheric pressure, a power piston connected to the movable wall and adapted to move in the forward directions through movement of the movable wall in the forward direction, an input member disposed in the power piston for movement in the forward and rearward directions according to operation of an operation member, and a valve mechanism that includes a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member. An output member is adapted to move in the forward direction through movement of the power piston in the forward direction as a result of movement of the movable wall in the forward direction, and an auxiliary movable wall is disposed in the front chamber and movable in the forward and rearward directions. The auxiliary movable wall includes an engaging portion that engages a portion of the output member upon forward movement of the auxiliary movable wall to move the output member in response to movement of the auxiliary movable wall. A diaphragm is disposed in the front chamber and defines together with the auxiliary movable wall an auxiliary chamber in the front chamber. A mechanism is also provided for connecting the rear chamber with the auxiliary chamber.

According to another aspect of the invention, a vacuum brake booster includes a housing, a movable wall disposed in the housing for movement in forward and rearward directions and dividing the interior of the housing into a front chamber connectable to a vacuum pressure source and a rear chamber adapted to be selectively communicated with the front chamber and atmospheric pressure, a power piston connected to the movable wall and adapted to move in the forward directions through movement of the movable wall in the forward direction, an input member disposed in the power piston for movement in the forward and rearward directions according to operation of an operation member, and a valve mechanism that includes a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member. An output member is adapted to move in the forward direction through movement of the power piston in the forward direction as a result of movement of the movable wall in the forward direction. An auxiliary chamber is disposed in the front chamber and is formed by a partition and a movable auxiliary wall. The auxiliary wall includes a portion which engages the output rod upon movement of the auxiliary wall in the forward direction, with the auxiliary wall being connected to the rear chamber to permit communication between the auxiliary chamber and the rear chamber.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
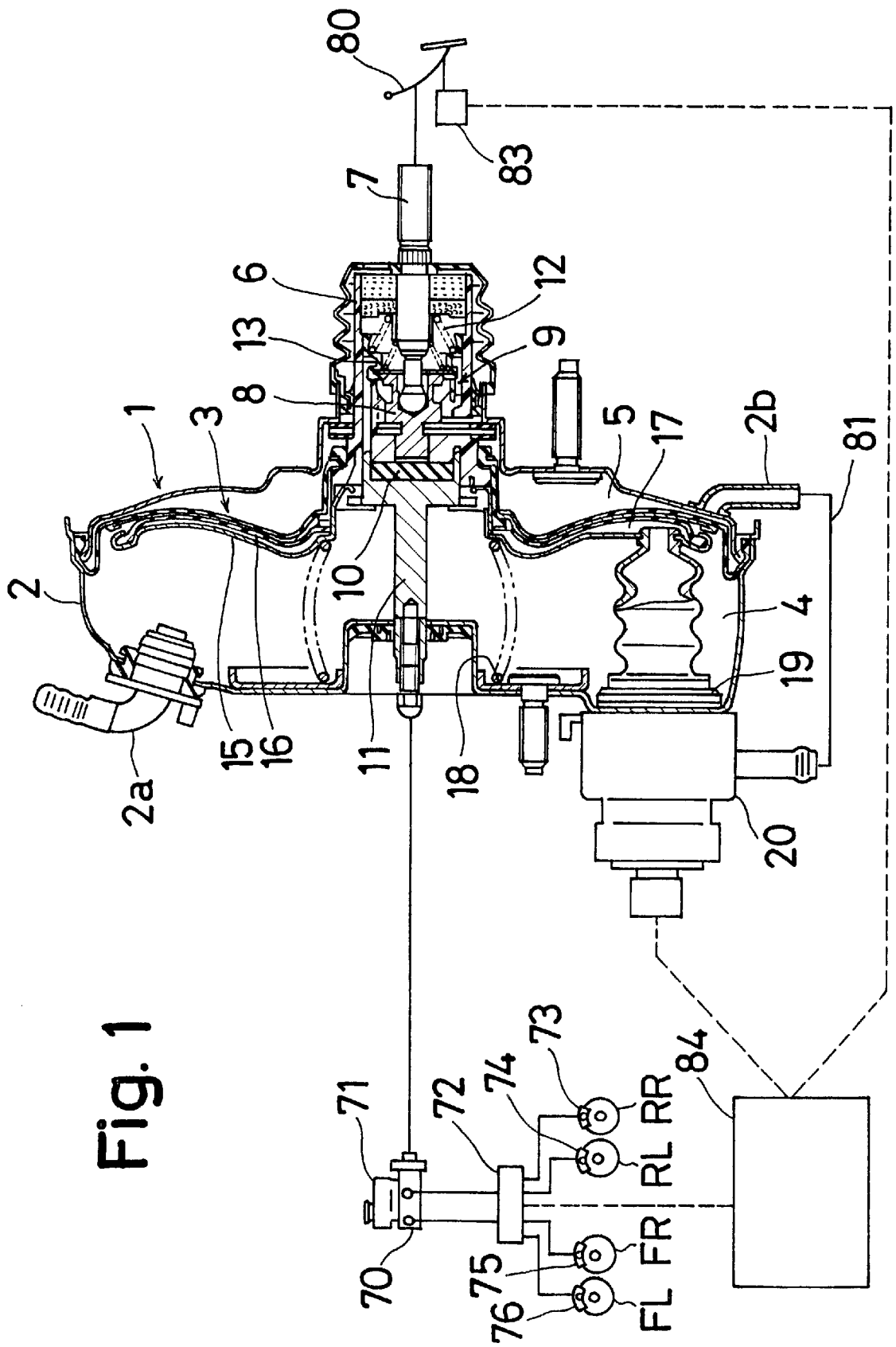
FIG. 1 is a cross-sectional view of a vacuum brake booster according to one embodiment of the present invention.

Referring initially to FIG. 1, the vacuum brake booster 1 according to the present invention includes a housing 2 having an interior in which is defined at least one pressure chamber and a movable wall 3 located within the interior of the housing. The movable wall 3 is connected in an air-tight manner to the outer peripheral portion of the housing 2 and is movable in the axial direction within the housing 2.

The interior of the housing 2 is divided into two chambers, a front chamber 4 and a rear chamber 5 that are sealed in an air-tight manner with respect to each other. The front chamber 4 is connected to a vacuum pressure source, such as the intake manifold of the vehicle engine, through an inlet port 2a so that the front chamber is continually under vacuum conditions.

A power piston 6 made of plastic material is located inside the housing and extends in the forward/rearward direction (i.e., from the right to left in FIG. 1). The inner periphery of the movable wall 3 is secured to the power piston 6. An input rod 7 is positioned within the power piston 6 and is connected at its rear end (i.e., the right end as viewed in FIG. 1) to a brake pedal 80 functioning as a brake operation member of the vehicle. The input rod 7 is also connected adjacent its forward end to an input member 8 as described below in more detail.

The input member 8 serves as a transmitting mechanism or transmitting means for transmitting the brake operation force from the input rod 7 to a reaction disc plate 10. An output rod 11 contacting the reaction disc plate 10 receives the brake operation force through the reaction disc plate 10 and is moved to the left to operate a piston in a master cylinder 71.

Figure 2:
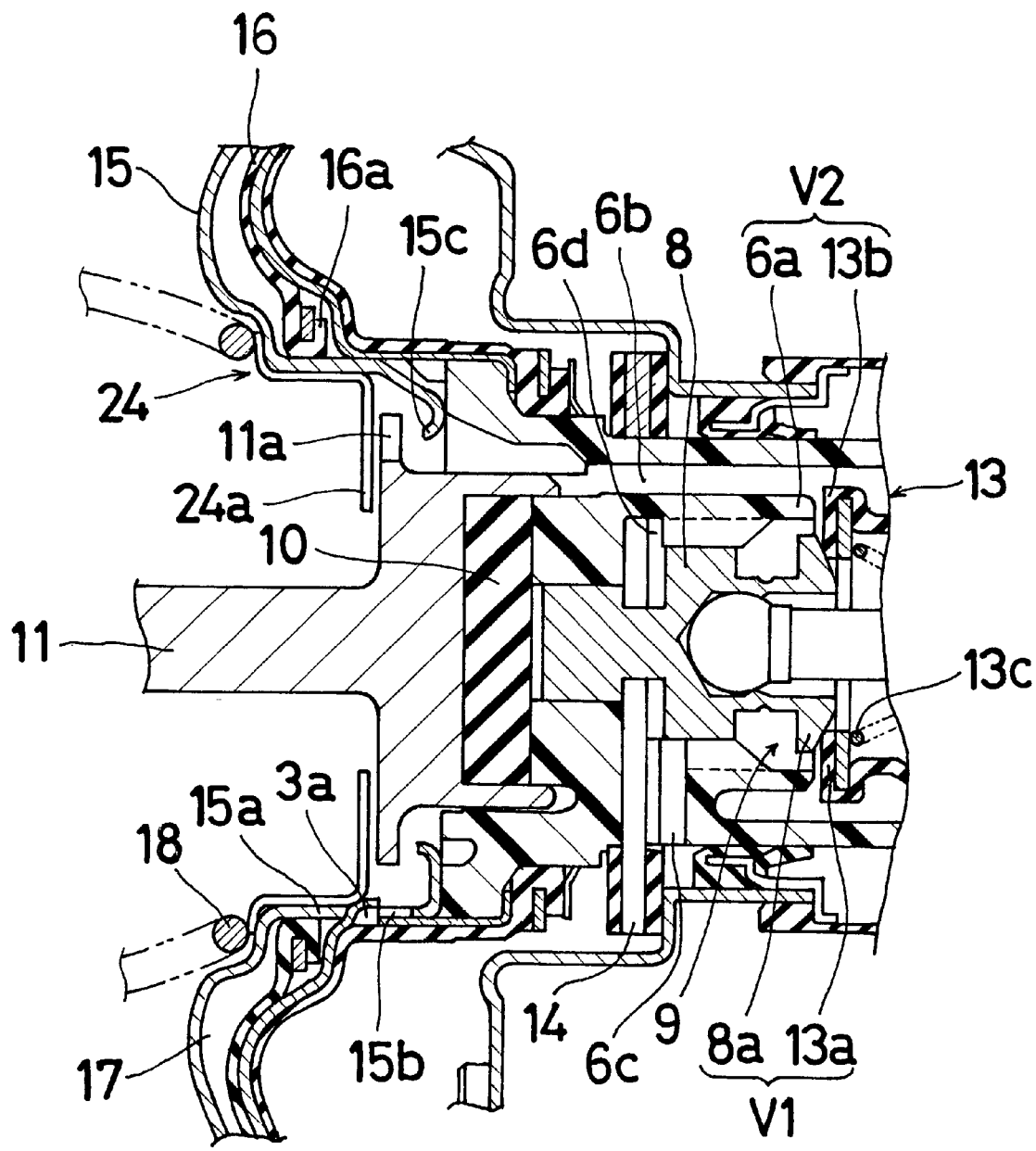
FIG. 2 is an enlarged cross-sectional view of a portion of the vacuum brake booster shown in FIG. 1, including the valve mechanism.

As shown in FIG. 2, a stopper 24 possessing an inwardly extending portion 24a is provided on the power piston 6 for preventing the leftward movement of the output rod 11 relative to the power piston 6. In addition, a spring retainer is secured to the input rod 7 for supporting a return spring 12.

A control valve 13 is provided on the power piston 6. This control valve 13 forms a valve mechanism 14. FIG. 2 shows an enlarged view of the valve mechanism 14. The valve mechanism includes an atmospheric pressure valve VI for establishing or interrupting communication between the rear chamber and atmospheric pressure, and a vacuum valve V2 for establishing communication between the front chamber 4 and the rear chamber 5.

The atmospheric pressure valve VI includes an annular atmospheric pressure valve seat 8a facing rearwardly (i.e., to the right and formed integrally with the rear end of the input member 8, and a forwardly facing atmospheric pressure seal portion 13a opposing the atmospheric pressure valve seat 8a and located at the forward end of the control valve 13. When the atmospheric pressure valve seat 8a contacts the atmospheric pressure seal portion 13a communication between the rear chamber 5 and atmospheric pressure is interrupted, and when the valve seat 8a is separated from the seal portion 13a communication between the rear chamber 5 and atmospheric pressure is established.

The vacuum valve V2 includes a rearwardly facing annular vacuum valve seat 6a formed on the power piston 6, and a forwardly facing vacuum seal portion 13b opposing the vacuum valve seat 6a and located at the forward end of the control valve 13. When the vacuum valve seat 6a contacts the seal portion 13b communication between the rear chamber 5 and the front chamber 4 is interrupted and when the vacuum valve seat 6a is separated from the seal portion 13b communication between the rear chamber 5 and the front chamber 4 is established.

The forward end of the control valve 13 on which are formed both of the seal portions 13a, 13b, is biased in the forward direction by a valve spring 13c. The atmospheric pressure seal portion 13a contacts the atmospheric pressure valve seat 8a when the input rod 7 is in an inoperative position. When the input rod 7 is in an operative position, the atmospheric pressure seal portion 13a contacts the vacuum valve seat 6a.

A key member 14 is positioned in a key groove 6d provided in the power piston 6 and is engaged with the housing 2 through a damper member. The power piston 6 further includes a vacuum passage 6b and an air passage 6c.

An auxiliary movable wall 15 is disposed in the rear chamber 5 and is engageable with a flange portion 11a of the output rod 11 at the inner peripheral portion thereof. The inner and outer peripheral portions of the auxiliary movable wall 15 are engaged with a bead portion 16a of a diaphragm 16 for sealing contact therebetween.

The inner bead portion 16a of the diaphragm 16 is slidably movable with the auxiliary movable wall 15 and an auxiliary variable pressure chamber 17 is defined between the diaphragm 16 and the movable wall 15.

The auxiliary movable wall 15 receives a biasing or spring force of a return spring 18 disposed between the housing 2 and a retainer. An expandable air passage 19 forming an air passage means is connected at one end in an air-tight manner with the auxiliary movable wall 15, while the opposite end of the air passage 19 is connected to the front surface of the housing 2 and extends through the front chamber 4.

The expandable air passage 19 connects the auxiliary variable pressure chamber 17 with a solenoid valve 20 forming a first valve means. The rear chamber 5 is connected to the solenoid valve 20 via a pipe 81.

Figure 3:
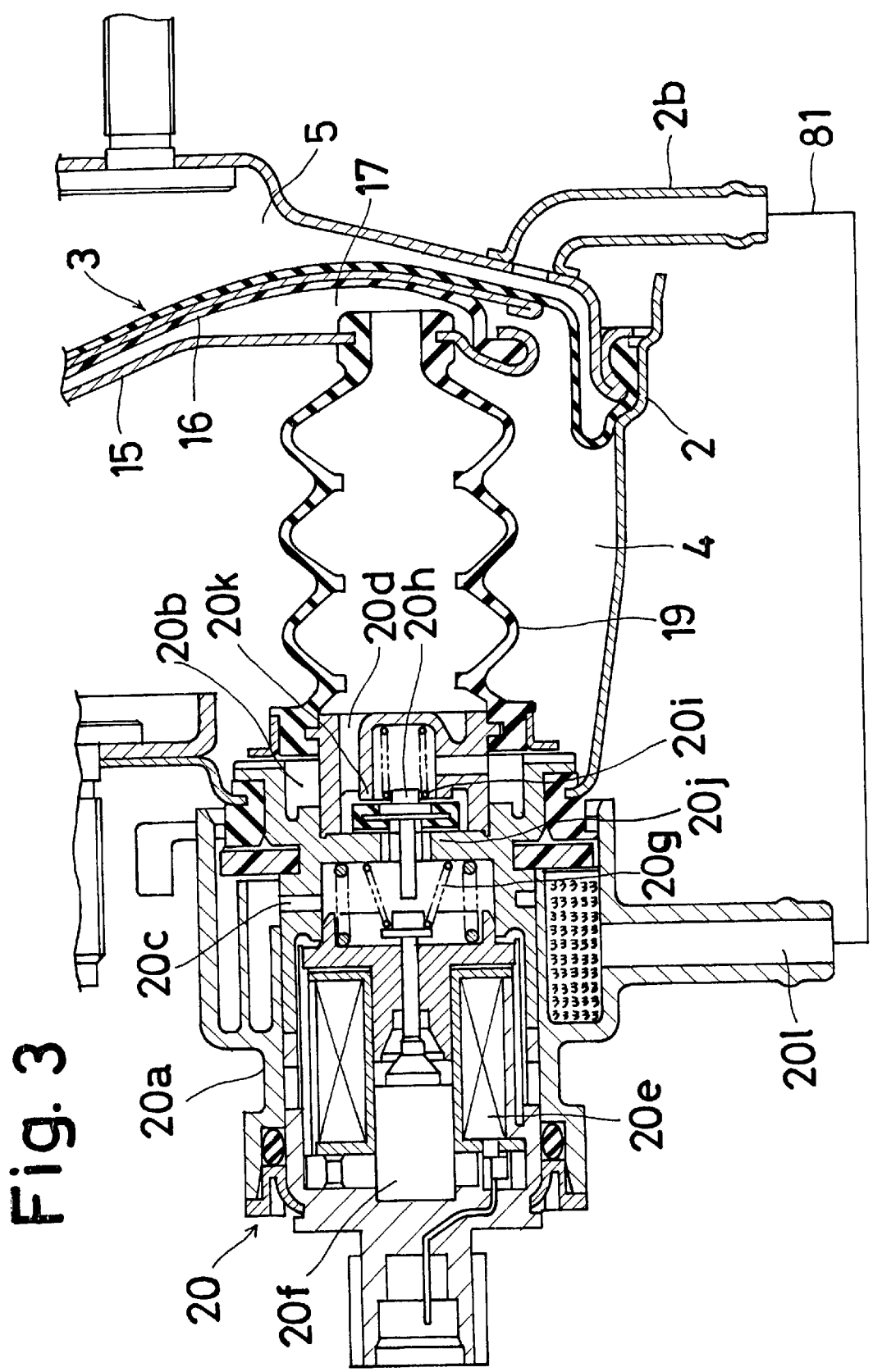
FIG. 3 is an enlarged cross-sectional view of a portion of the vacuum brake booster shown in FIG. 1, including the solenoid valve.

As best shown in FIG. 3, the solenoid valve 20 includes a constant pressure port 20b located in a valve housing 20a for communication with the front chamber 4, an atmospheric pressure port 20c exposed to atmospheric pressure through an air cleaner, an atmospheric pressure outlet 20l connected to the air pipe 81, and a variable pressure port 20d connected to the air passage 19. An electromagnetic coil 20e is connected to the battery of the vehicle by terminals, and electric power is supplied from the battery by a controller 84 which is illustrated in FIG. 1.

A plunger 20f is movably disposed inwardly of the solenoid 20e within the valve housing 20a. In addition, a valve body 20h is movably disposed at the rear side of the plunger and is coaxially disposed with respect to the plunger 20f.

The plunger 20f and the valve body 20h are biased to the left as viewed in FIG. 3 by respective springs 20g, 20i. When the plunger 20f moves in the rearward direction (i.e., to the right), the plunger 20f engages the valve body 20h to move the valve body 20h in the rearward direction. The valve body 20h and the plunger 20f are thus movable together as a unit in the rearward direction.

As shown in FIG. 3, which shows the initial condition of the solenoid, because the plunger 20f and the valve body 20h are forced by the springs 20g, 20i in the forward direction, the valve body 20h is in contact with an atmospheric pressure valve seat 20j and the valve body 20h is out of contact with a constant pressure valve seat 20k. Accordingly, the auxiliary variable pressure chamber 17 is in communication with the front chamber 4 via a clearance between the constant pressure valve seat 20k and the valve body 20h, and via the constant pressure port 20b.

When the solenoid coil 20e is energized by the supply source (battery), the solenoid 20e move s or pulls the plunger 20f and thus the valve body 20h in the rearward direction (i.e., towards the right in FIG. 3) against the biasing forces of the springs 20g, 20i to contact the valve body 20h within the constant pressure valve seat 20k while also separating the valve body 20h from the atmospheric pressure valve seat 20j. Accordingly, the auxiliary variable pressure chamber 17 is connected with the rear chamber 5 through the passage 20c, the air cleaner, the atmospheric pressure inlet 20l, the pipe 81 and the pipe 2b.

Having described the features associated with the vacuum brake booster, the operation of the vacuum brake booster 1 will be described. When a driver of the vehicle is not operating the brake operation member or brake pedal 80, the booster is under the condition shown in FIGS. 1 and 2 so that the atmospheric pressure seal portion 13a is in engagement with the atmospheric pressure seat 8a, the vacuum seal portion is disengaged or separated from the vacuum valve seat 6a of the power piston 6, and the rear chamber 5 is in communication with the vacuum pressure source through the air passage 6c, the clearance between the valve seat 6a and seal portion 13b, the vacuum passage 6b, and the rear chamber 4.

Figure 4:
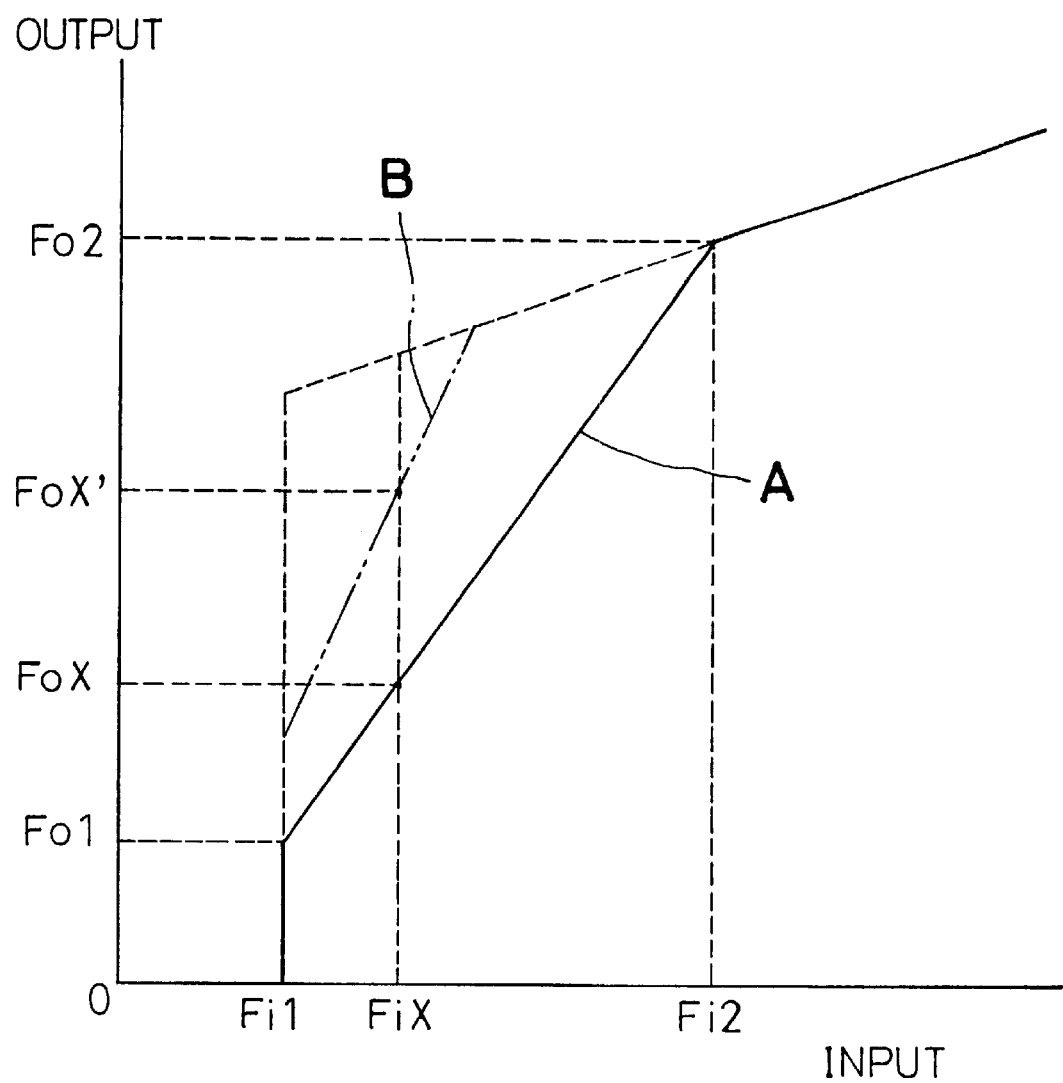
FIG. 4 is a graph showing the input/output characteristics of the vacuum brake booster illustrated in FIG. 1.

FIG. 4 shows the characteristic performance of the vacuum brake booster 1, with the y-axis representing the output and the x-axis representing the input of the booster. When the driver of the vehicle depresses the brake pedal 80 with an input force FiX, the input rod 7 connected to the brake pedal 80 receives the brake force and is moved leftward in the forward direction. The input member 8 secured to the input rod 7 is moved as a unit with the input rod 7 toward the left in the forward direction.

With the movement of the input member 8, the atmospheric pressure seal portion 13a and the vacuum seal portion 13b of the control valve 13 are moved by the spring force of valve spring 13c with the input member 8 in the forward direction. The vacuum seal portion 13b contacts the valve seat 6a of the power piston 6 to interrupt communication between the rear chamber 5 and the front chamber 4 and accordingly between the rear chamber 5 and the vacuum pressure source of the vehicle.

With further forward movement of the input member 8, the engagement between the atmospheric pressure seal portion 13a and the atmospheric pressure valve seat 8a are separated. This results in communication of the rear chamber 5 with atmospheric pressure through the rear opening and inner portion of the power piston 6, the clearance between the atmospheric pressure seal portion 13a and the valve seat 8a, and the air passage 6c.

Upon the introduction of atmospheric pressure into the rear chamber 5, a pressure differential is generated between the rear and front chambers 5, 4. This pressure differential applies a force or load to the movable wall 3, and the power piston 6 connected to the movable wall 3 generates and outputs a boosted braking force to the output rod 11 via the reaction disc plate 10. Thereafter, the boosting force of the vacuum brake booster is controlled in response to the brake operation force of the driver transmitted to the input rod 7 by the reaction force received by the input rod 7 from the reaction disc plate 10 via the input member 8 to selectively engage the seal portion 13a with the valve seat 8a or the seal portion 13b with the valve seat 6a.

The reaction force of the braking force by the power piston 6 and the brake operation force generated by the depression of the brake pedal 80 and transmitted to the input member 8 are balanced by the latter (i.e., the reaction force) being added to the former (i.e., the brake operation force). The balanced output between the brake operation force (input FiX) and the reaction force from the reaction disc plate 10 is indicated as FoX in FIG. 4.

Under this condition, because the solenoid coil 20e of the solenoid valve 20 is de-energized, the auxiliary variable pressure chamber 17 is in communication with the front chamber 4 and no pressure differential is generated between the opposite sides of the auxiliary movable wall 15. Under this condition, the auxiliary movable wall 15 is not operated. The characteristic performance of normal brake operation is indicated in FIG. 4 as line A.

When, for example, an obstacle appears in front of the vehicle, the driver of the vehicle may depress the brake pedal 80 with an input of FiX which value is detected by a pedal stroke switch 83. Based on this detected value, the controller 84 judges the necessity of an emergency braking operation and when such emergency braking operation is judged to be necessary, the controller sends a signal to the solenoid valve 20 to energize the solenoid coil 20e and apply an emergency braking independently of the brake pedal depressing operation by the driver. In other words, the vacuum brake booster 1 is operated under two modes, one for normal braking operation by the driver and the other an automatic braking operation by the actuation of the solenoid valve 20.

When the solenoid coil 20e receives the signal indicating an emergency braking operation, an electromagnetic force is generated to move the plunger 20f and the valve body 20h in the rearward direction (i.e., to the right in FIG. 3) against the spring forces of the spring 20g, 20i. As explained earlier, the movement of the plunger 20f and the valve body 20h establishes communication between the rear chamber 5 and the auxiliary variable pressure chamber 17. atmospheric pressure is then introduced into the chamber 17 from the rear chamber 5, because the driver is depressing the brake pedal 80 and the rear chamber 5 has been connected to atmospheric pressure.

Due to the introduction of atmospheric pressure into the variable pressure chamber 17, a pressure differential is generated between the front and rear sides of the auxiliary movable wall 15. The movable wall 15 is thus slidably moved along the inner periphery of the bead portion 16a of the diaphragm 16. With this movement of the auxiliary movable wall 15, the flange portion 11a of the output rod 11 is engaged by an engaging portion 15a of the wall 15 to add a load to the output rod 11 in the forward direction. This load is not influenced by the reaction disc plate 10 of the booster and so the braking force is directly outputted without applying any reaction force to the input member 8.

Accordingly, the braking force from the booster is the total of the driver's normal braking operation, the power piston forward force and the auxiliary movable wall forward force. In other words by introducing atmospheric pressure into the auxiliary variable pressure chamber 17, the braking output operated on the output rod 11 is increased from FoX to FoX' relative to the same brake operation force FiX operated on the input rod 7. This input/output characteristic performance of the booster is represented by the operation line B in FIG. 4.

When the driver of the vehicle judges that the braking force is no longer necessary, the brake pedal is released to move the input rod 7 in the rearward direction to thereby move the input member 8. The seal portion 13a is then engaged with the input member 8 and the vacuum seal portion 13b is separated from the valve seat 6a of the power piston 6, thus interrupting communication of the rear chamber 5 with atmospheric pressure and instead communicating the rear chamber with the front chamber 4.

This will increase the vacuum in the rear chamber 5 to reduce the boosting force of the power piston 6. The power piston 6 and the input rod 7 are moved in the rearward direction by the reaction force from the master cylinder 70 and the biasing force of the return spring 18 to complete the return step of the brake booster.

When the brake pedal 80 is released, the brake stroke detecting switch detects the pedal release to send a signal to the controller 84. Then the controller de-energizes the solenoid coil 20e to return the plunger 20f and the valve body 20h to their original positions by the spring force. The auxiliary variable pressure chamber 17 is then connected to the front chamber 4 to return the auxiliary movable wall 15 by force of the return spring 18 to disconnect the engagement between the movable wall and the flange portion 11a of the output rod 11.

The difference (FoX–FoX') of the output on the operation line A and the operation line B under the same input FiX increases in proportion to the increase of the input. This is because the pressure in the rear chamber 5 increases in response to the increase of the input and accordingly the pressure in the auxiliary variable pressure chamber 15 increases likewise.

According to the brake booster of the present invention, the introduction of atmospheric pressure into the auxiliary variable pressure chamber 17 is produced through the air passage 19, the solenoid valve 20, the passages 81, 2b, and the rear chamber 5. Thus, no connecting pipe for the connection between the solenoid valve and the vehicle compartment is necessary, thus simplifying the assembly work by negating the aforementioned connecting process and improving the work efficiency and productivity.

Further, during emergency braking, because the input to the brake pedal 80 (i.e., the depression force by the driver) is insufficient, the vacuum brake booster 1 is automatically operated to increase the output braking force from FoX to FoX'. By adding an auxiliary output force in response to the input increase to the normal braking force output, the slope of the emergency braking operation line B can be larger compared to the slope of the normal braking operation line A. This will provide a good braking feeling as compared to other known brake boosters such as that described above.

Further, the vacuum brake booster of the present invention is constructed such that the auxiliary variable pressure chamber 17 is connected to the rear chamber 5 and the output rod 11 can be pushed by the auxiliary movable wall 15. This structure reduces the reaction force to the input rod 7 to improve the response performance characteristics of the booster.

Also, the solenoid valve 20 is operated in response to the emergency braking operation, (i.e., in response to the vehicle movement condition) and so the operation of the solenoid 20 can be property and accurately achieved.

Figure 5:
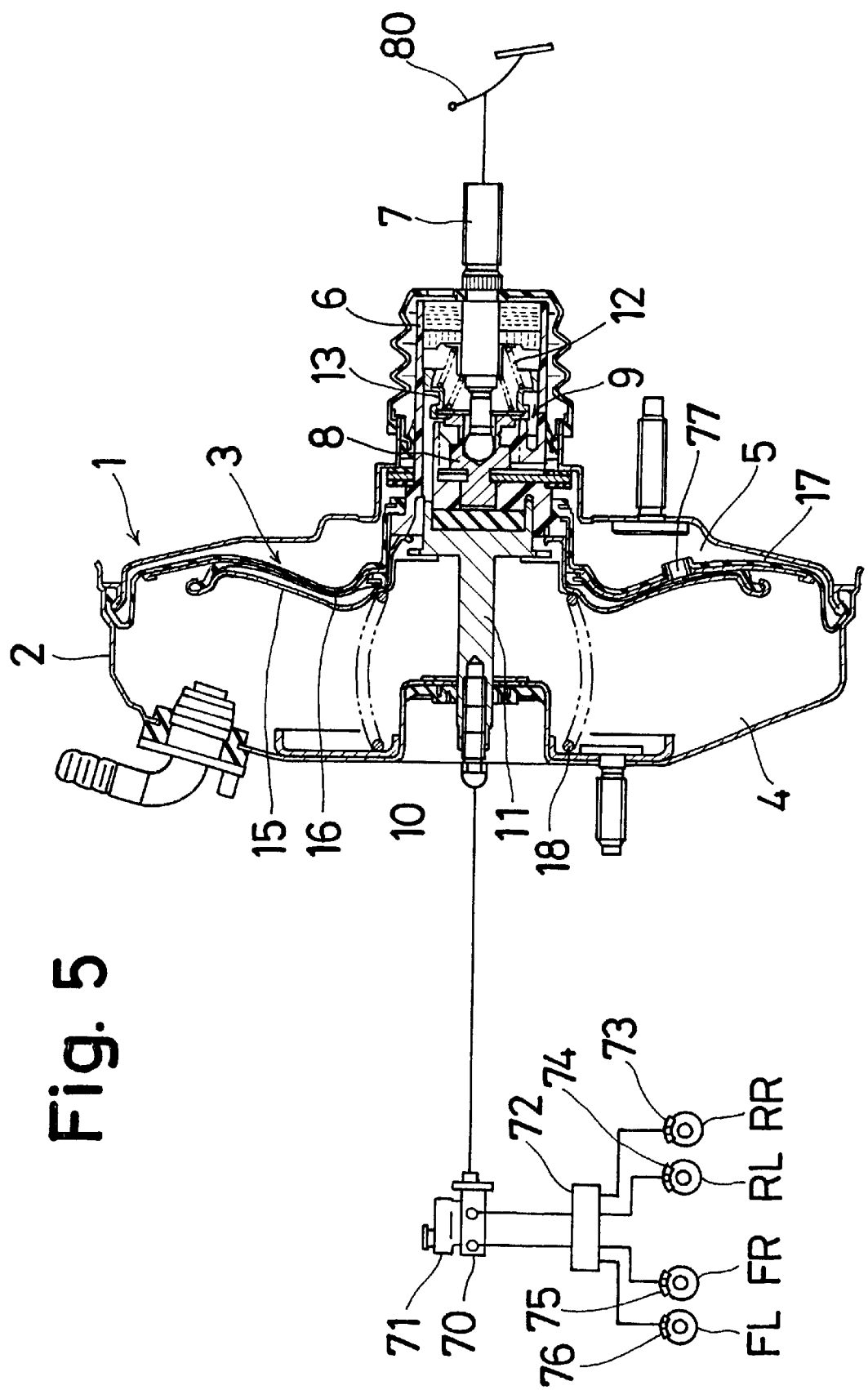
FIG. 5 is a cross-sectional view of the vacuum brake booster according to a second embodiment of the present invention.

As described above, the auxiliary variable pressure chamber 17 is connected to the rear chamber 5 through the air passage 19, the solenoid valve 20, and the passages 81, 2b. This can be changed so that, for example, when the solenoid valve is not used, the auxiliary variable pressure chamber can be directly connected to the rear chamber of the vacuum brake booster as shown in FIG. 5. In FIG. 5, the features corresponding to those described above and illustrated in FIGS. 1–3 are designated with the same reference numerals.

As shown in FIG. 5, a passage 77 is provided which penetrates the diaphragm 16 and movable wall 3 in an air-tight manner as a unit, and the auxiliary variable pressure chamber 17 is connected to the rear chamber 5 via this passage 77. The operation of this booster 1 is as follows. When the driver of the vehicle is not depressing the brake pedal 80, each component of the vacuum brake booster 1 is positioned as shown in FIG. 5.

In the valve mechanism 9, the atmospheric pressure seal portion is engaged with the valve seat of input member 8 for interrupting communication between atmospheric pressure and the rear chamber 5, and the vacuum seal portion of the control valve 13 is disengaged from the vacuum valve seat of the power piston 6 for establishing communication between the rear and front chambers 5, 4. Accordingly, the rear chamber 5 is in communication with the vacuum source such as the intake manifold of the engine.

Figure 6:
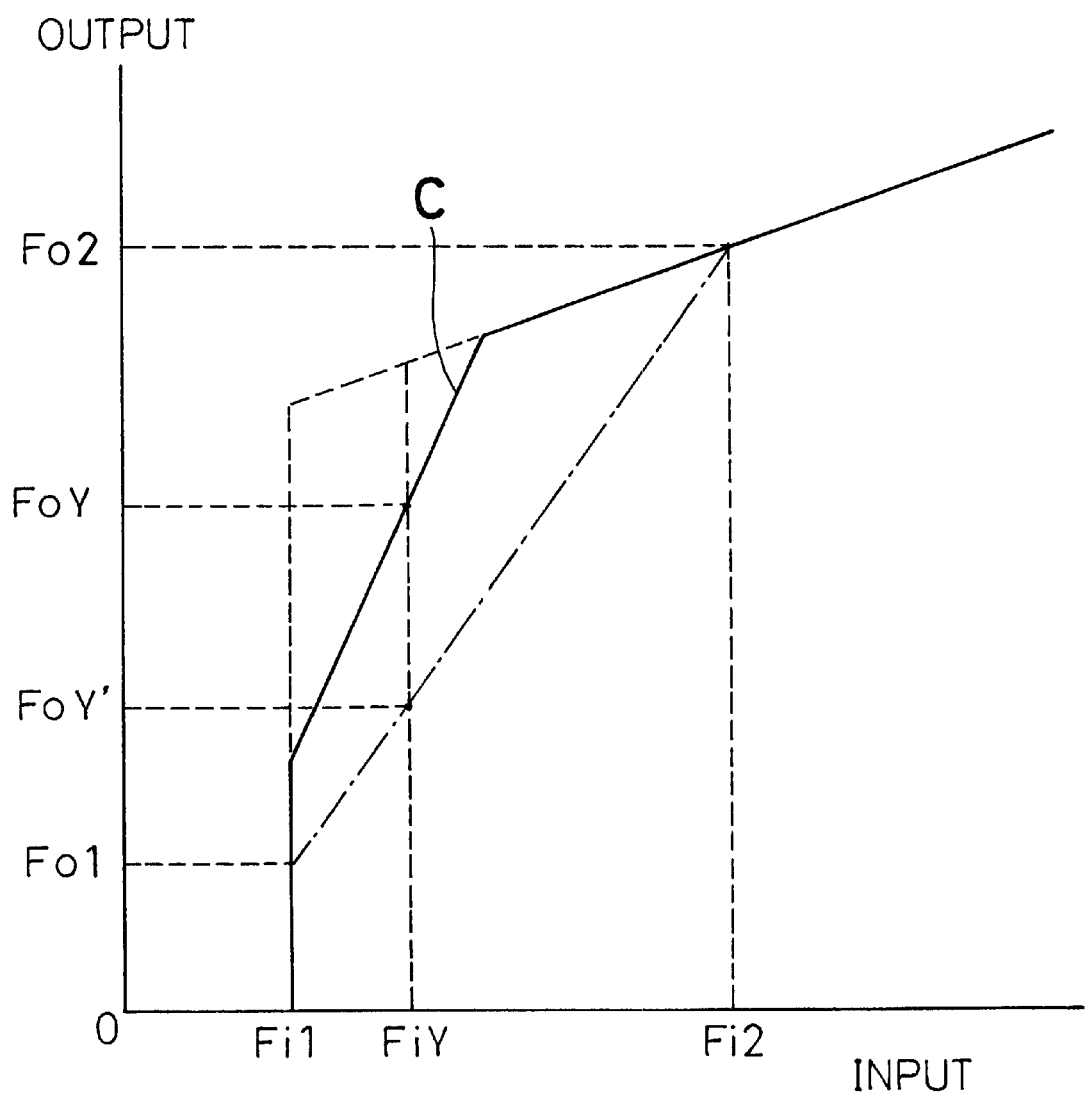
FIG. 6 is a graph showing the input/output characteristics of the vacuum brake booster shown in FIG. 5.

FIG. 6 shows the characteristic performance of the vacuum brake booster 1 illustrated in FIG. 5, wherein the y-axis represents the output and the x-axis represents the input of the booster. When the driver of the vehicle depresses the brake pedal 80 with a force FiY, the input rod 7 connected to the pedal is moved forward (i.e., to the left in FIG. 5) in response to the driver's operation force. The forward movement of the input rod 7 causes the input member 8 connected thereto as a unit to also move in the forward direction.

The vacuum seal portion of the control valve 13 is then engaged with the valve seat of the power piston 6 to interrupt communication between the rear chamber and the front chamber and accordingly, between the rear chamber and the vacuum source. Further forward movement of the input member 8 disengages the atmospheric pressure seal portion of the control valve 13 from the valve seat to introduce atmospheric pressure into the rear chamber 5 to generate the pressure differential between the rear and front chambers 5, 4.

The movable wall 3 receives the load produced by the pressure differential, and the power piston 6 connected to the wall 3 outputs the boosted braking force to the output rod 11 via reaction disc plate 10. In addition, atmospheric pressure is introduced into the auxiliary variable pressure chamber 17 from the rear chamber 5 via the passage 77 to generate the pressure differential between the front chamber 4 and the auxiliary variable pressure chamber 17.

Receiving the load produced by the pressure differential, the auxiliary movable wall 15 moves the output rod 11 in the forward direction to output the boosted braking force. Thereafter, the valve mechanism 9 selectively adopts output operation conditions from amongst an output reduction operation, an output maintaining operation, and an output increase operation by the reaction force of reaction disc plate 10 received by the input rod 7 for controlling the boosting force of the booster in response to the driver's braking operation.

The reaction force to the braking force generated by the power piston 6 and the auxiliary movable wall 15 and the brake operation force generated by the brake pedal operation are transmitted to the reaction disc plate 10 to be balanced. This balanced condition causes the valve mechanism to be in an output maintaining operation condition. When the brake operation force Fix and the reaction force from the reaction disc plate 10 are balanced, the output from the output rod 11 is shown as FoY in FIG. 6.

In the brake booster without the auxiliary structure (i.e., without the auxiliary movable wall and the auxiliary variable pressure chamber) as shown in FIG. 6, the output rod 11 is moved forward by the forward movement of the power piston 6 and the input to the input rod 7, to output FoY under the input FiY. However, in the vacuum brake booster of FIG. 5, atmospheric pressure is introduced into the auxiliary chamber 17 from the rear chamber. Thus, the forward moving force of the auxiliary movable wall 15 is added to the output rod 11 in addition to the forward moving force of the power piston and the input to the input rod 7. This will thus increase the output by the forwarding force of the movable wall 15.

Compared to the booster without the auxiliary system, the booster of FIG. 5 increases the output by (FoY–FoY'). This increase ((FoY–FoY') can be increased in accordance with the increase of the input. This is because the pressure in the rear chamber 5 increases in accordance with increases in the input and likewise the pressure in the auxiliary chamber 15 connected to the rear chamber 5 increases in accordance with increases in the input.

The characteristic performance of the booster in FIG. 5 is shown by the line C in FIG. 6 wherein the performance line indicates the function of the brake operation force (input) operated on the input rod 7 under normal braking operation and braking force output operated on the output rod 11. According to the brake booster 1 of FIG. 5, the operational responsiveness can be improved by the structure that the auxiliary chamber 17 is connected to the rear chamber and that the output rod 11 is pushed by the auxiliary movable wall 15 to reduce the reaction force on the input rod 7.

According to this embodiment, the auxiliary chamber 17 is in communication with the rear chamber 5 through the solenoid valve 20. However, this construction can be changed. For example, instead of using a solenoid valve (electromagnetic valve), any mechanical type valve device can be used for controlling the communication between the auxiliary chamber and the rear chamber.

Figure 7:
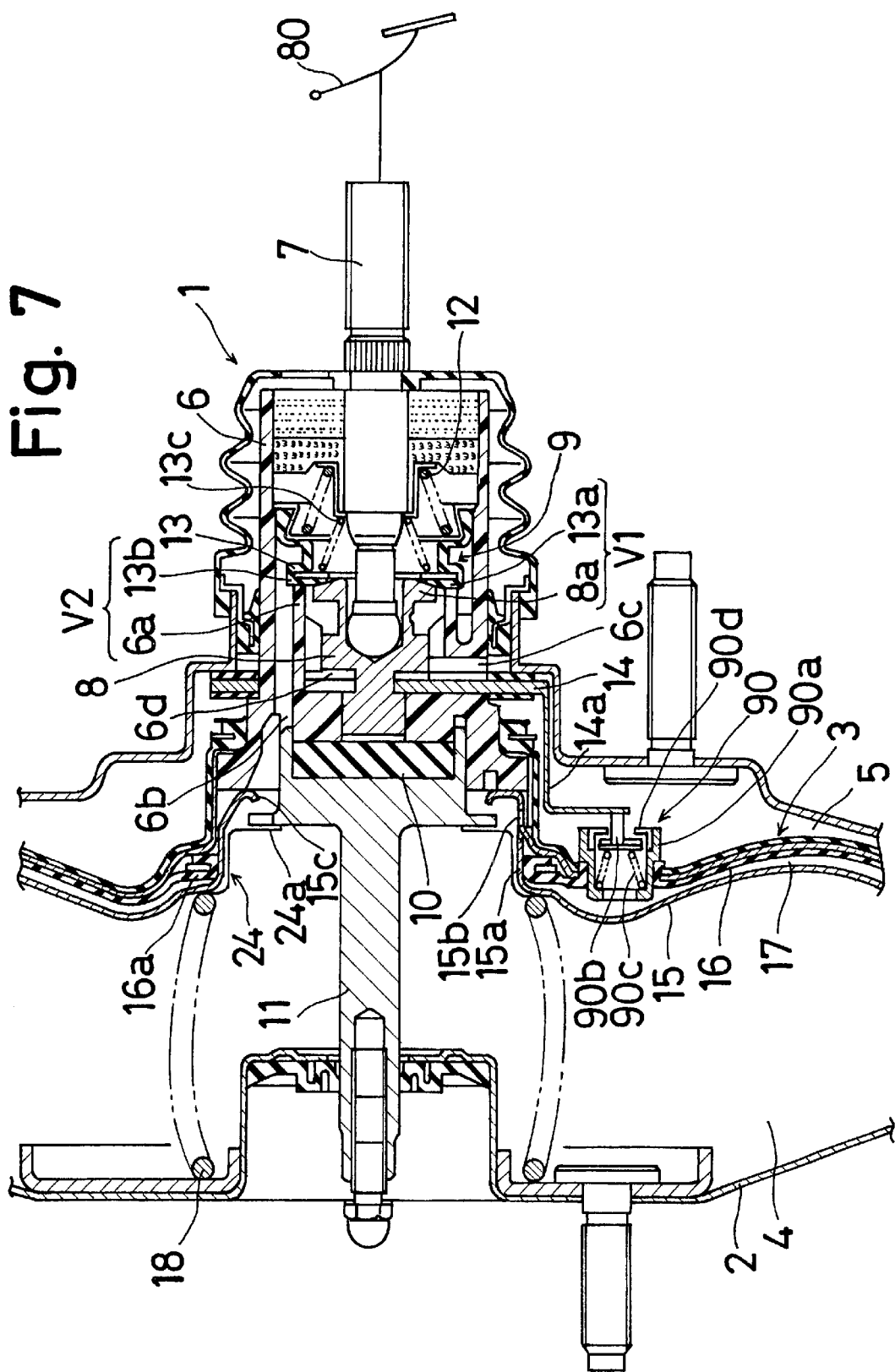
FIG. 7 is an enlarged cross-sectional view of a portion of the vacuum brake booster according to another embodiment of the present invention.

An example of such an arrangement is shown in FIG. 7. This embodiment differs from the previous embodiments with respect to the details associated with the mechanical valve 90. Other parts of the booster corresponding to those described above and shown in the drawing figures are designated by the same reference numerals as those used above.

In FIG. 7, the auxiliary variable pressure chamber 17 is in communication with the rear chamber 5 via the mechanical valve or mechanical valve means 90. The valve 90 is integrally disposed with the movable wall 3 and the diaphragm 16, and extends in the axial direction (i.e., in the left and right direction in FIG. 7). The valve 90 includes a cylindrical portion 90a penetrating the diaphragm 16 and the movable wall 3 in an air-tight manner, a valve body 90b disposed in the cylindrical portion 90a and axially movable in the cylindrical portion 90a, and a valve spring 90c biasing the valve body 90b in the rearward direction (i.e., in to the right as viewed in FIG. 7).

The valve body 90b is adapted to be engaged with or disengaged from a valve seat 90d formed on an inwardly extending flange portion at the rear opening portion of the cylindrical portion 90a. When the valve body 90h is engaged with the seat 90d, communication between the rear chamber 5 and the auxiliary chamber 17 is interrupted and when the valve body 90b is disengaged from the seat 90d, communication between the chambers 5 and 17 is established.

A key member 14 includes an engagement portion 14a which engages the valve body 90b when the key member 14 is moved forward relative to the movable wall 3 to thereby also move the valve body 90b in the forward direction by the engagement of the valve body 90b with the engagement portion 14a of the key member 14.

The characteristic performance of the booster of FIG. 7 is the same as the booster of the first embodiment shown in FIG. 1 and so the operation of the booster of this embodiment will be explained with reference to the graph shown in FIG. 4. When a driver of the vehicle is not operating the brake pedal 80, the booster is under the condition shown in FIG. 7. That is, the atmospheric pressure seal portion 13a is in engagement with the atmospheric pressure seat 8a, the vacuum seal portion is disengaged from the vacuum valve seat 6a of the power piston 6, and the rear chamber 5 is in communication with the vacuum pressure source through the air passage 6c, the clearance between the valve seat 6a and seal portion 13b, the vacuum passage 6b and the rear chamber 4. In addition, the valve body 90b of the valve 90 is engaged by the key engagement portion 14a and so the valve body 90b is disengaged from the valve seat 90d. Thus, communication between the rear chamber 5 and the auxiliary chamber 17 is established so that the two are in communication with the vacuum source.

When the driver of the vehicle depresses the brake pedal 80 with an input force FiX, the input rod 7 connected to the brake pedal receives the brake force and is moved in the forward direction (i.e., to the left). Then the input member 8 secured to the input rod 7 is moved as a unit with the input rod 7 in the forward direction. With the movement of the input member 8, the atmospheric pressure seal portion 13a and the vacuum seal portion 13b of the control valve 13 are moved by the spring force of the valve spring 13c with the input member 8 in the forward direction. The vacuum seal portion 13b contacts the valve seat 6a of the power piston 6 to interrupt communication between the rear chamber 5 and the front chamber 4 and accordingly between the rear chamber 5 and the vacuum pressure source of the vehicle.

With further forward movement of the input member 8, the atmospheric pressure seal portion 13a and the atmospheric pressure valve seat 8a are separated from each other. Thus the rear chamber 5 is in communication with atmospheric pressure through the rear opening and the inner portion of the power piston 6, the clearance between the atmospheric pressure seal portion 13a and the valve seat 8a, and the passage 6c.

By the introduction of atmospheric pressure into the rear chamber 5, a pressure differential is generated between the rear and front chambers 5 and 4. The movable wall 3 receives the load generated by the pressure differential, and the power piston 6 connected to the movable wall 3 generates and outputs the boosted braking force to the output rod 11 via the reaction disc plate 10.

The key member 14 relatively moves rearward with respect to the input member 8, the power piston 6, and the movable wall 3 during forward movement of the power piston 6 and the input member 8. Because the key member 14 is moved rearward relative to the valve 90, the valve body 90b is moved rearward by the force of the spring 90c and becomes seated on the seat 90d to thereby interrupt communication between the rear chamber 5 and the auxiliary chamber 17. Accordingly, atmospheric pressure introduced into the rear chamber 5 will not flow into the auxiliary chamber 17.

Thereafter, the boosting force of the vacuum brake booster is controlled in response to the brake operation force of the driver transmitted to the input rod 7 by the reaction force received by the input rod 7 from the reaction disc plate 10 via the input member 8 to selectively engage the seal portion 13a with the valve seat 8a or the seal portion 13b with the valve seat 6a.

The reaction force of the braking force by the power piston 6 and the brake operation force generated by the depression of the brake pedal 80 and transmitted to the input member 8 are balanced by the latter being added to the former. The balanced output between the brake operation force (input FiX) and the reaction force from the reaction disc plate 10 is indicated as FoX in FIG. 4. The characteristic performance of the normal brake operation is indicated in FIG. 4 as line A.

When, for example, an obstacle appears in front of the vehicle, the driver of the vehicle depresses the brake pedal 80 with an input of FiX, and the normal braking operation is changed to an emergency braking operation. The pressure differential is thus generated between the rear chamber 5 and the front chamber 4 by the valve operation (valve mechanism 9) in response to the movement of the input member 8 to thereby move forward the input member 8, the power piston 6, and the movable wall 3.

Sudden depression of the brake pedal 80 causes the key member 14 to engage with the input member 8 to move the key member by the input member 8 in the forward direction. The key member 14 is engaged with the forward wall portion of an axial hole 6d of the power piston 6, which is the most advanced position of the key member relative to the power piston (shown in FIG. 7)

Accordingly, the valve 90 maintains the separated condition of the valve body 90b from the valve seat 90d, and communication between the rear chamber and the auxiliary chamber is maintained to introduce atmospheric pressure into the auxiliary chamber 17. this creates the pressure differential between the front and rear sides of the auxiliary movable wall 15. Accordingly, the movable wall 15 is slidably moved forward along the bead portion 16a of the diaphragm 16.

With the movement of the auxiliary movable wall 15, the flange portion 11a of the output rod 11 is engaged with the wall 15 to add a load or force thereto in the forward direction. This load is not influenced by the reaction disc plate 10 of the booster and so the braking force is directly outputted without applying any reaction force to the input member 8.

Accordingly, the braking force from the booster is the total of the driver's normal braking operation, the power piston forward force and the auxiliary movable wall forward force. In other words, by introducing atmospheric pressure into the auxiliary variable pressure chamber 17, the braking output operated on the output rod 11 is increased from FoX to FoX' relative to the same brake operation force FiX operated on the input rod 7. This input/output characteristic performance of the booster is represented by the operation line B in FIG. 4.

When the driver of the vehicle judges that the braking force is no longer necessary, the brake pedal is released to move the input rod 7 in the rearward direction to thereby move the input member 8. The seal portion 13a is then engaged with the input member 8 and the vacuum seal portion 13b is separated from the valve seat 6a of the power piston 6 to interrupt communication of the rear chamber 5 with atmospheric pressure and to instead connect the rear chamber to the front chamber 4.

The rearward movement of the input member 8 moves the key member 14 and the valve body 90b in the same direction by the spring force of the valve spring 90c. With the movement of the valve body 90b, the valve body 90b is seated on the valve seat 90d to interrupt communication between the rear chamber and the auxiliary chamber.

This will increase the vacuum in the rear chamber 5 to reduce the boosting force of the power piston 6. The power piston 6 and the input rod 7 are moved in the rearward direction by the reaction force from the master cylinder 70 and the biasing force of the return spring 18 to complete the return step of the brake booster.

The pressure in the auxiliary chamber 17 is kept at atmospheric pressure because the valve 90 interrupts communication between the rear chamber 5 and the auxiliary chamber 17. Accordingly, the reduction of the output occurs along the operation line B in FIG. 4. By returning the pedal 80 and the input rod 7 to their original positions, the valve 90 returns to its original position to establish communication between the rear chamber 5 and the auxiliary chamber 17.

Thus, atmospheric pressure in the auxiliary chamber 17 is discharged through the rear chamber 5, the air passage 6c, the clearance between the atmospheric pressure seal position 13a and the valve seat 8a, the vacuum passage 6b and the front chamber 4 to the vacuum source thereby to complete the return step of the vacuum brake booster.

The difference (FoX–FoX') of the output on the operation line A and the operation line B under the same input FiX increases in proportion to the increase of the input. This is because the pressure in the rear chamber 5 increases in response to the increase of the input and accordingly the pressure in the auxiliary variable pressure chamber 15 increases likewise.

According to this embodiment of the present invention explained above, by using a mechanical valve 90 instead of a relatively expensive solenoid valve, the controller 84 can be eliminated to thereby reduce the manufacturing cost.

Figure 8:
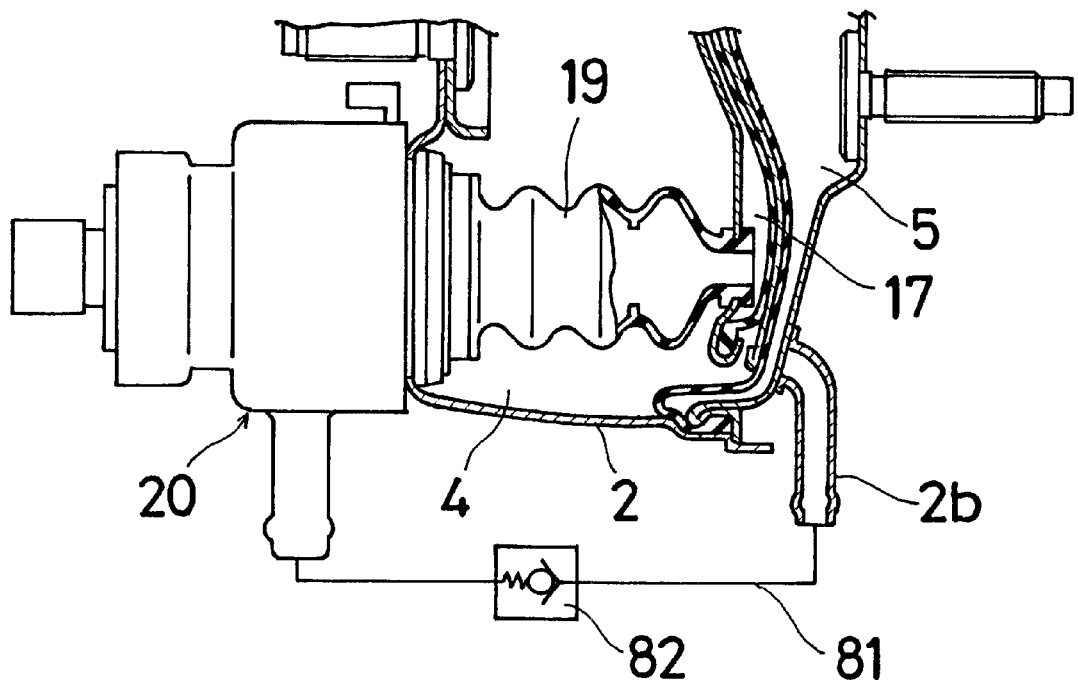
FIG. 8 is an enlarged cross-sectional view of an alternative communication passage that can be used in the vacuum booster of the present invention.

FIG. 8 illustrates another embodiment of the present invention showing a portion of the brake booster in cross-section and illustrating the electromagnetic valve (i.e., the solenoid valve). In this version of the present invention, a second valve 82 (a pressure differential valve) is disposed in the line 81. The other parts of the booster are the same or similar to those described above and shown in FIGS. 1 and 5, and so a detailed explanation of such features will not be repeated.

Figure 9:
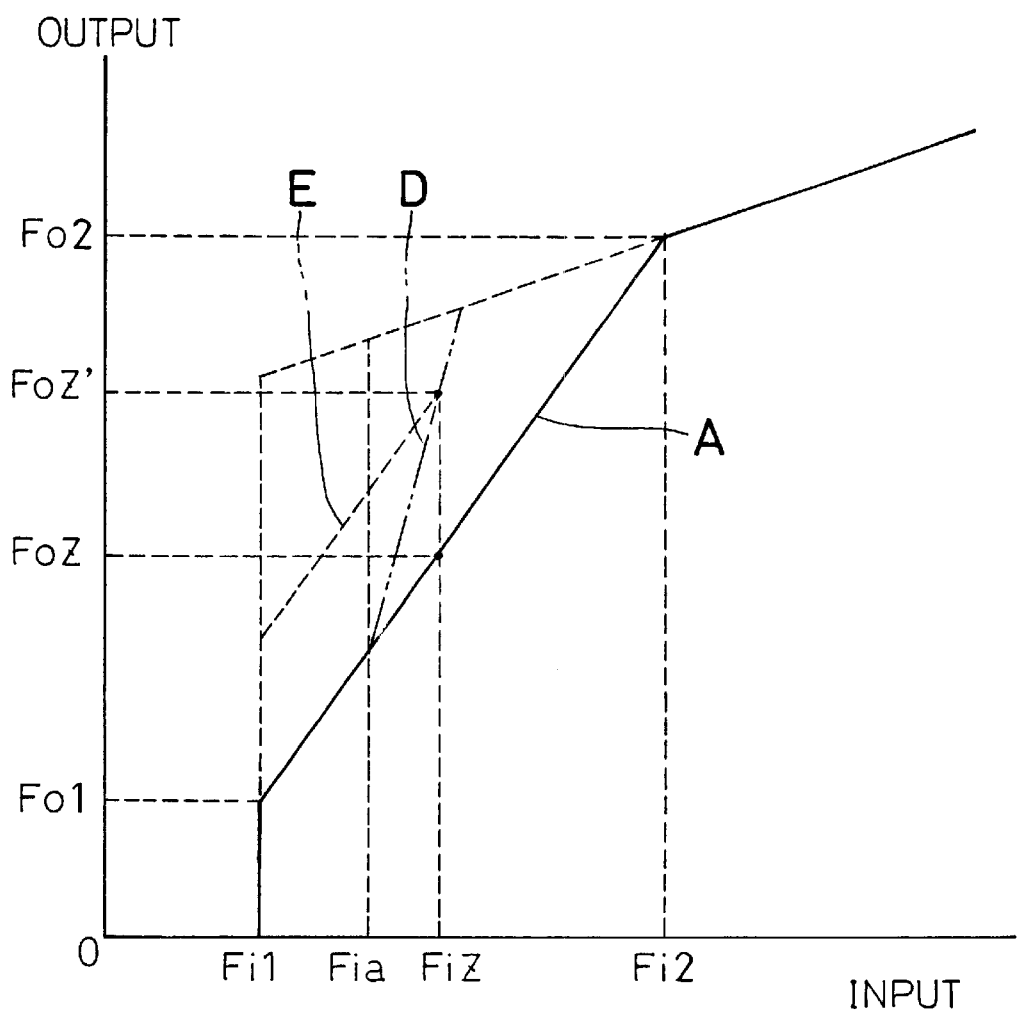
FIG. 9 is a graph showing the input/output characteristics of the vacuum brake booster shown in FIG. 5.

FIG. 9 shows a characteristic performance of the vacuum brake booster of FIG. 8, wherein the y-axis represents the output of the booster and the x-axis represents the input of the booster. The second valve 82 is disposed in the passage 81 between the rear chamber 5 and the solenoid valve 20. The pressure for opening the second valve is set to be Pa in the rear chamber 5 at the time the input force Fa is applied.

The operation of the vacuum booster of this embodiment will be explained referring to FIGS. 1–3, but with the operation during normal braking operation being omitted as it is the same as that described above in the first embodiment.

When, for example, an obstacle appears in front of the vehicle, the driver of the vehicle depresses the brake pedal 80 with the input of FiZ, with such value being detected by a pedal stroke switch 83. Based on this detected value, the controller 84 judges the need for an emergency braking operation. When such emergency braking operation is judged to be necessary, the controller sends a signal to the solenoid valve 20 to energize the solenoid coil 20e and apply emergency braking independently of the driver's depressing operation of the brake pedal. Thus, the vacuum brake booster 1 is operated under two modes, one for normal braking operation by the driver and the other for automatic braking operation by the actuation of the solenoid valve 20.

When the solenoid coil 20e receives the signal, an electromagnetic force is generated to move the plunger 20f and the valve body 20h in the rearward direction against the spring forces of the springs 20g, 20i. As explained earlier, the movement of the plunger 20f and the valve body 20h establishes communication between the rear chamber 5 and the auxiliary variable pressure chamber 17. Atmospheric pressure is then introduced into the chamber 17 from the rear chamber 5, because the driver is depressing the brake pedal 80 and the rear chamber 5 has been connected to atmospheric pressure.

The input FiZ is larger than the input Fia as shown in FIG. 9 and under this condition, the pressure Pb in the rear chamber 5 is larger than the pressure Pa in the rear chamber 5 at the output associated with the input Fia. Accordingly, the second valve 82 is opened to establish communication between the rear chamber 5 and the auxiliary chamber 17 to introduce atmospheric pressure into the auxiliary chamber 17. Due to the introduction of atmospheric pressure into the auxiliary variable pressure chamber 17, a pressure differential is generated between the front and rear sides of the auxiliary movable wall 15. The movable wall 15 thus sidably moves along the inner peripheral portion of the bead portion 16a of the diaphragm 16.

As the auxiliary movable wall 15 moves, the flange portion 11a of the output rod 11 engages the wall 15 to add a load or force to the wall 15 in the forward direction. This load is not influenced by the reaction disc plate 10 of the booster, and so the braking force is directly outputted without applying any reaction force to the input member 8.

Accordingly, the braking force from the booster is the total of the driver's normal braking operation, the power piston forward force and the auxiliary movable wall forward force. In other words, by introducing atmospheric pressure into the auxiliary variable pressure chamber 17, the braking output operated on the output rod 11 is increased from FoZ to FoZ' relative to the same brake operation force Fia operated on the input rod 7. The pressure in the auxiliary chamber 17 is the difference between the pressure Pb and Pa (Pb–Pa).

This input/output characteristic performance of the booster is represented by the operation line D in FIG. 9.

When the driver of the vehicle judges that the braking force is no longer necessary, the brake pedal is released to move the input rod 7 in the rearward direction and thereby move the input member 8. The seal portion 13a is then engaged with the input member 8 and the vacuum seal portion 13b is separated from the valve seat 6a of the power piston 6 to interrupt communication of the rear chamber 5 with atmospheric pressure while instead effecting communication of the rear chamber 5 with the front chamber 4. This will increase the vacuum in the rear chamber 5 to reduce the boosting force of the power piston 6. The power piston 6 and the input rod 7 are moved in the rearward direction by the reaction force from the master cylinder 70 and the biasing force of the return spring 18 to complete the return step of the brake booster.

In response to the reduction of the pressure in the rear chamber 5, the second valve 82 is closed to interrupt the communication between the rear chamber and the auxiliary chamber 17. Accordingly, the auxiliary chamber 17 is still open to atmospheric pressure to keep the pressure inside to (Pb−Pa). The return of the emergency braking operation is shown in line E of FIG. 9, reducing the output.

When the brake pedal 80 is released, the brake stroke detecting switch detects the pedal release to send a signal to the controller 84. The controller then de-energizes the solenoid coil 20e to return the plunger 20f and the valve body 20h to their original positions by the spring force. The auxiliary variable pressure chamber 17 is then connected to the front chamber 4 to return the auxiliary movable wall 15 by the return spring 18 and disconnect the engagement with the flange portion 11a of the output rod 11.

According to this embodiment of the present invention, the second valve 82 is provided in the passage 81 to generate auxiliary output when the input exceeds a predetermined value. This will be suitable for the brake booster to generate sufficient auxiliary input only when a high braking force is required. It is relatively easy to change the predetermined input force by just changing the opening pressure of the second valve 82.

Figure 10:
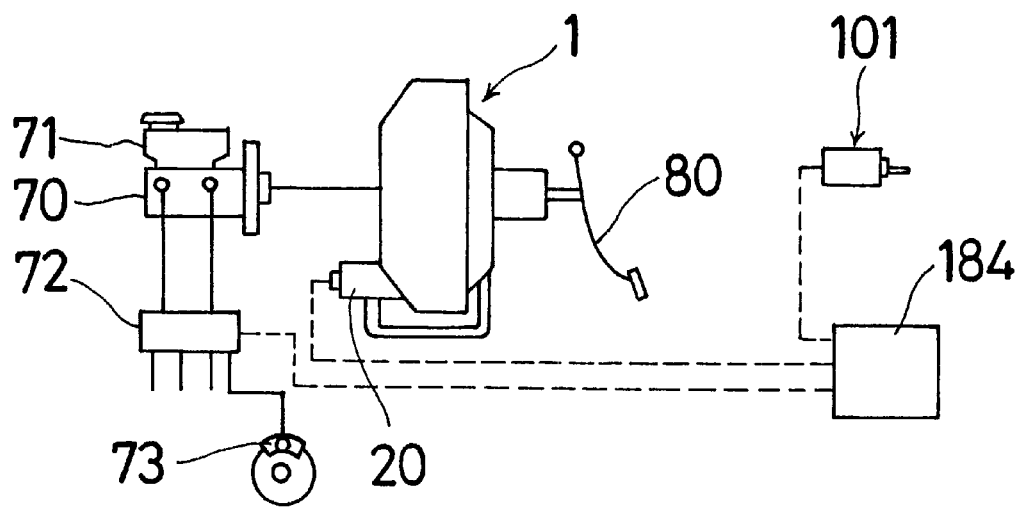
FIG. 10 is a general outline construction of the vacuum brake booster according to a further embodiment of the present invention.

In accordance with another embodiment of the invention shown in FIG. 10, an operating switch 101 is provided near the driver's seat for changing the communication between the rear chamber and the auxiliary chamber by operating the solenoid valve 20 via the controller 184. This will allow the driver of the vehicle to change the braking force according to his/her intent by switching over the switch 101. Thus, in addition to the vehicle condition, the braking force can be controlled by the intent of the driver. This may be used when the required braking force is large due to an increase in the vehicle mass associated with, for example, an increase in the number of vehicle occupants, or simply when the driver has insufficient strength to fully depress the brake pedal.

As explained above, the present invention provides a relatively simple structure for connecting the rear chamber with the auxiliary chamber. In addition, the disclosed brake booster enables an improvement in the efficiency associated with assembling the booster in a vehicle. It is also possible to realize an increase in the output while at the same time allowing atmospheric pressure to be introduced into and discharged from the auxiliary chamber with a relatively simple structure to improve the work efficiency and reduce the cost.

The present invention further allows for proper operation of the valve mechanism, particularly the first valve. It is also possible to achieve an improvement in the braking force and an increase in the braking force when the input force exceeds a predetermined value.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vacuum brake booster for a vehicle comprising:

a housing in which is disposed at least one pressure chamber;

a movable wall disposed in the housing for movement in forward and rearward directions of the vehicle and dividing the pressure chamber into a front chamber to be connected to a vacuum pressure source and a rear chamber selectively connected to the front chamber and atmospheric pressure;

a power piston connected to the movable wall;

an input member disposed in the power piston for movement in the forward and rearward directions of the vehicle through operation of an operation member;

a valve mechanism having a vacuum valve connecting the rear chamber with the front chamber in response to movement of the input member and an atmospheric pressure valve connecting the rear chamber to the atmospheric pressure in response to movement of the input member;

an output member outputting a forward movement force of the power piston by moving forwardly with forward movement of the power piston in response to the forward movement of the movable wall;

an auxiliary movable wall disposed in the front chamber and movable in the forward and rearward directions, the output member being adapted to be engaged by the auxiliary movable wall to move in response to movement of the auxiliary movable wall;

a partition member disposed in the front chamber and defining together with the auxiliary movable wall an auxiliary chamber in the front chamber, the rear chamber and the auxiliary chamber being connectable with each other;

a communication passage fluidly connecting the rear chamber and the auxiliary chamber; and first valve means for permitting and preventing fluid communication between the rear chamber and the auxiliary chamber via the communication passage, wherein the first valve means is actuated in response to a vehicle condition to establish communication between the auxiliary chamber and the rear chamber.

2. A vacuum brake booster for a vehicle comprising:

a housing in which is disposed at least one pressure chamber;

a movable wall disposed in the housing for movement in forward and rearward directions of the vehicle and dividing the pressure chamber into a front chamber to be connected to a vacuum pressure source and a rear chamber selectively connected to the front chamber and atmospheric pressure;

a power piston connected to the movable wall;

an input member disposed in the power piston for movement in the forward and rearward directions of the vehicle through operation of an operation member;

a valve mechanism having a vacuum valve connecting the rear chamber with the front chamber in response to movement of the input member and an atmospheric pressure valve connecting the rear chamber to the atmospheric pressure in response to movement of the input member;

an output member outputting a forward movement force of the power piston by moving forwardly with forward movement of the power piston in response to the forward movement of the movable wall;

an auxiliary movable wall disposed in the front chamber and movable in the forward and rearward directions, the output member being adapted to be engaged by the auxiliary movable wall to move in response to movement of the auxiliary movable wall;

a partition member disposed in the front chamber and defining together with the auxiliary movable wall an auxiliary chamber in the front chamber, the rear chamber and the auxiliary chamber being connectable with each other;

a communication passage fluidly connecting the rear chamber and the auxiliary chamber; and first valve means for permitting and preventing fluid communication between the rear chamber and the auxiliary chamber via the communication passage, wherein the first valve means is actuated by operation of the driver of the vehicle to establish communication between the rear chamber and the auxiliary chamber.

3. A vacuum brake booster for a vehicle comprising:

a housing in which is disposed at least one pressure chamber;

a movable wall disposed in the housing for movement in forward and rearward directions of the vehicle and dividing the pressure chamber into a front chamber to be connected to a vacuum pressure source and a rear chamber selectively connected to the front chamber and atmospheric pressure;

a power piston connected to the movable wall;

an input member disposed in the power piston for movement in the forward and rearward directions of the vehicle through operation of an operation member;

a valve mechanism having a vacuum valve connecting the rear chamber with the front chamber in response to movement of the input member and an atmospheric pressure valve connecting the rear chamber to the atmospheric pressure in response to movement of the input member;

an output member outputting a forward movement force of the power piston by moving forwardly with forward movement of the power piston in response to the forward movement of the movable wall;

an auxiliary movable wall disposed in the front chamber and movable in the forward and rearward directions, the output member being adapted to be engaged by the auxiliary movable wall to move in response to movement of the auxiliary movable wall;

a partition member disposed in the front chamber and defining together with the auxiliary movable wall an auxiliary chamber in the front chamber, the rear chamber and the auxiliary chamber being connectable with each other;

a communication passage fluidly connecting the rear chamber and the auxiliary chamber;

first valve means for permitting and preventing fluid communication between the rear chamber and the auxiliary chamber via the communication passage; and second valve means provided in the communication passage between the first valve means and the rear chamber for establishing communication between the first valve means and the rear chamber when the pressure in the rear chamber reaches a predetermined value.

4. A vacuum brake booster for a vehicle comprising:

a housing having an interior;

a movable wall disposed in the housing for movement in forward and rearward directions, the movable wall dividing the interior of the housing into a front chamber connectable to a vacuum pressure source and a rear chamber adapted to be selectively communicated with the front chamber and atmospheric pressure;

a power piston connected to the movable wall and adapted to move in the forward direction through movement of the movable wall in the forward direction;

an input member disposed in the power piston for movement in the forward and rearward directions according to operation of an operation member;

a valve mechanism that includes a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member;

an output member adapted to move in the forward direction through movement of the power piston in the forward direction as a result of movement of the movable wall in the forward direction;

an auxiliary movable wall disposed in the front chamber and movable in the forward and rearward directions, the auxiliary movable wall including an engaging portion that engages a portion of the output member upon forward movement of the auxiliary movable wall to move the output member in response to movement of the auxiliary movable wall;

a diaphragm disposed in the front chamber and defining together with the auxiliary movable wall an auxiliary chamber in the front chamber; and means for connecting the rear chamber with the auxiliary chamber including a communication passage fluidly connecting the rear chamber and the auxiliary chamber; and a first valve which permits and prevents fluid communication between the rear chamber and the auxiliary chamber via the communication passage, wherein the first valve is actuated in response to a vehicle condition to establish communication between the auxiliary chamber and the rear chamber.

5. A vacuum brake booster for a vehicle comprising:

a housing having an interior;

a movable wall disposed in the housing for movement in forward and rearward directions, the movable wall dividing the interior of the housing into a front chamber connectable to a vacuum pressure source and a rear chamber adapted to be selectively communicated with the front chamber and atmospheric pressure;

a power piston connected to the movable wall and adapted to move in the forward direction through movement of the movable wall in the forward direction;

an input member disposed in the power piston for movement in the forward and rearward directions according to operation of an operation member;

a valve mechanism that includes a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member;

an output member adapted to move in the forward direction through movement of the power piston in the forward direction as a result of movement of the movable wall in the forward direction;

an auxiliary movable wall disposed in the front chamber and movable in the forward and rearward directions, the auxiliary movable wall including an engaging portion that engages a portion of the output member upon forward movement of the auxiliary movable wall to move the output member in response to movement of the auxiliary movable wall;

a diaphragm disposed in the front chamber and defining together with the auxiliary movable wall an auxiliary chamber in the front chamber; and means for connecting the rear chamber with the auxiliary chamber including a communication passage fluidly connecting the rear chamber and the auxiliary chamber; and a first valve which permits and prevents fluid communication between the rear chamber and the auxiliary chamber via the communication passage, wherein the first valve is actuated by operation of the driver of the vehicle to establish communication between the rear chamber and the auxiliary chamber.

6. A vacuum brake booster for a vehicle comprising:

a housing having an interior;

a movable wall disposed in the housing for movement in forward and rearward directions, the movable wall dividing the interior of the housing into a front chamber connectable to a vacuum pressure source and a rear chamber adapted to be selectively communicated with the front chamber and atmospheric pressure;

a power piston connected to the movable wall and adapted to move in the forward direction through movement of the movable wall in the forward direction;

an input member disposed in the power piston for movement in the forward and rearward directions according to operation of an operation member;

a valve mechanism that includes a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member;

an output member adapted to move in the forward direction through movement of the power piston in the forward direction as a result of movement of the movable wall in the forward direction;

an auxiliary movable wall disposed in the front chamber and movable in the forward and rearward directions, the auxiliary movable wall including an engaging portion that engages a portion of the output member upon forward movement of the auxiliary movable wall to move the output member in response to movement of the auxiliary movable wall;

a diaphragm disposed in the front chamber and defining together with the auxiliary movable wall an auxiliary chamber in the front chamber;

means for connecting the rear chamber with the auxiliary chamber including a communication passage fluidly connecting the rear chamber and the auxiliary chamber;

a first valve which permits and prevents fluid communication between the rear chamber and the auxiliary chamber via the communication passage; and a second valve disposed in the communication passage at a position between the first valve and the rear chamber for establishing communication between the first valve and the rear chamber when the pressure in the rear chamber reaches a predetermined value.

7. A vacuum brake booster for a vehicle comprising:

a housing having an interior;

a movable wall disposed in the housing for movement in forward and rearward direction, the movable wall dividing the interior of the housing into a front chamber connectable to a vacuum pressure source and a rear chamber adapted to be selectively communicated with the front chamber and atmospheric pressure;

a power piston connected to the movable wall and adapted to move in the forward direction through movement of the movable wall in the forward direction;

an input member disposed in the power piston for movement in the forward and rearward directions according to operation of an operation member;

a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member;

an output member adapted to move in the forward direction through movement of the power piston in the forward direction as a result of movement of the movable wall in the forward direction;

an auxiliary chamber disposed in the front chamber and formed by a partition and a movable auxiliary wall, said auxiliary wall including a portion which engages the output rod upon movement of the auxiliary wall in the forward direction, said auxiliary wall being connected to the rear chamber by a communication passage to permit communication between the auxiliary chamber and the rear chamber; and a first valve which permits and prevents fluid communication between the rear chamber and the auxiliary chamber via the communication passage;

wherein the first valve is actuated in response to a vehicle condition to establish communication between the auxiliary chamber and the rear chamber.

8. A vacuum brake booster for a vehicle comprising:

a housing having an interior;

a movable wall disposed in the housing for movement in forward and rearward direction, the movable wall dividing the interior of the housing into a front chamber connectable to a vacuum pressure source and a rear chamber adapted to be selectively communicated with the front chamber and atmospheric pressure;

a power piston connected to the movable wall and adapted to move in the forward direction through movement of the movable wall in the forward direction;

an input member disposed in the power piston for movement in the forward and rearward directions according to operation of an operation member;

a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member;

an output member adapted to move in the forward direction through movement of the power piston in the forward direction as a result of movement of the movable wall in the forward direction;

an auxiliary chamber disposed in the front chamber and formed by a partition and a movable auxiliary wall, said auxiliary wall including a portion which engages the output rod upon movement of the auxiliary wall in the forward direction, said auxiliary wall being connected to the rear chamber by a communication passage to permit communication between the auxiliary chamber and the rear chamber; and a first valve which permits and prevents fluid communication between the rear chamber and the auxiliary chamber via the communication passage;

wherein the first valve is actuated by operation of the driver of the vehicle to establish communication between the rear chamber and the auxiliary chamber.

9. A vacuum brake booster for a vehicle comprising:

a housing having an interior;

a movable wall disposed in the housing for movement in forward and rearward direction, the movable wall dividing the interior of the housing into a front chamber connectable to a vacuum pressure source and a rear chamber adapted to be selectively communicated with the front chamber and atmospheric pressure;

a power piston connected to the movable wall and adapted to move in the forward direction through movement of the movable wall in the forward direction;

an input member disposed in the power piston for movement in the forward and rearward directions according to operation of an operation member;

a vacuum valve adapted to selectively permit and prevent communication between the rear chamber and the front chamber in response to movement of the input member and an atmospheric pressure valve adapted to permit and prevent communication of the rear chamber with the atmospheric pressure in response to movement of the input member;

an output member adapted to move in the forward direction through movement of the power piston in the forward direction as a result of movement of the movable wall in the forward direction;

an auxiliary chamber disposed in the front chamber and formed by a partition and a movable auxiliary wall, said auxiliary wall including a portion which engages the output rod upon movement of the auxiliary wall in the forward direction, said auxiliary wall being connected to the rear chamber by a communication passage to permit communication between the auxiliary chamber and the rear chamber; and a valve disposed in the communication passage for establishing communication between the auxiliary chamber and the rear chamber when the pressure in the rear chamber reaches a predetermined value.

\* \* \* \* \*